(12) United States Patent
Dijkstra et al.

(10) Patent No.: US 8,858,831 B2
(45) Date of Patent: Oct. 14, 2014

(54) SCINTILLATOR COMPOSITIONS

(75) Inventors: Peter Dijkstra, Groningen (NL); Heinrich Johannes Wörtche, Bedum (NL)

(73) Assignee: Stichting Incas3, Assen (NL)

( * ) Notice: Subject to any disclaimer, the term of this patent is extended or adjusted under 35 U.S.C. 154(b) by 324 days.

(21) Appl. No.: 13/444,212

(22) Filed: Apr. 11, 2012

(65) Prior Publication Data

US 2013/0270443 A1 Oct. 17, 2013

(51) Int. Cl.
*C09K 11/06* (2006.01)
*C07F 5/02* (2006.01)
*C07D 235/04* (2006.01)

(52) U.S. Cl.
USPC ............ 252/301.17; 252/301.29; 548/110; 250/370.11; 250/392; 250/391; 250/366; 250/390.11

(58) Field of Classification Search
USPC .............. 252/301.17, 301.29; 548/110; 250/370.11, 392, 391, 366, 390.11
See application file for complete search history.

(56) References Cited

U.S. PATENT DOCUMENTS 5,433,896 A * 7/1995 Kang et al. ............... 252/700
5,981,746 A * 11/1999 Wolfbeis et al. ............ 540/450

* cited by examiner

*Primary Examiner* — Carol M Koslow

(74) *Attorney, Agent, or Firm* — Nixon & Vanderhye P.C.

(57) ABSTRACT

Scintillator compositions are provided which include a solvent or matrix containing a fluorophore having the formula (I) and/or a fluorophore having the formula (II),

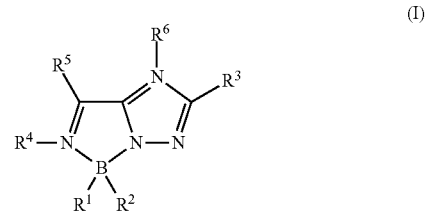

(I)

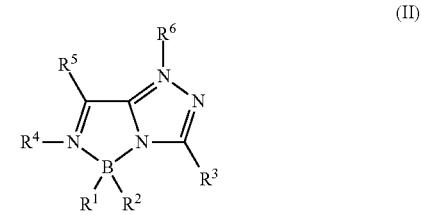

(II)

wherein $R^1$ and $R^2$, being identical or different, are independently chosen from the group consisting of hydrogen, halogen, alkyl which optionally contains one or more heteroatoms, alkoxy, aryl and alkyne with an aryl end group; $R^3$ is chosen from the group consisting of hydrogen, alkyl which optionally contains one or more heteroatoms, aryl, heterocycle, ether and ester; $R^4$ and $R^5$, being identical or different, are independently chosen from the group consisting of hydrogen, alkyl which optionally contains one or more heteroatoms, aryl, heterocycle, ether and ester, whereby the $R^4$ and $R^5$ groups are optionally combined to one cyclic structure; and $R^6$, if present, is chosen from the group consisting of hydrogen, aryl and alkyl.

21 Claims, 2 Drawing Sheets

SCINTILLATOR COMPOSITIONS

FIELD

The present invention relates to a scintillator composition, an apparatus for detecting at least neutrons from a source, a radiation detector for detecting at least electron antineutrinos from a source, a process for detecting neutrons and/or electron antineutrinos wherein use is made of said scintillator composition, and a process for detecting neutrons and/or electron antineutrinos wherein use is made of said radiation detector.

BACKGROUND

Scintillators are known to be used for detecting neutron radiation emitted by a radioactive source such as a nuclear reactor. Scintillators can attractively be used to monitor operational status, power levels, and fissile content in nuclear reactors in real time with relatively simple antineutrino detectors. Liquid scintillators, which are loaded with neutron absorbers, generally possess a better pulse shape discrimination (PSD) than solid scintillators, and thus, are preferred when discrimination between signals arising from neutron capture and gamma rays is required.

Especially, organic liquid scintillators are attractive since they can be produced in large quantities at low cost, they possess a high hydrogen density, and they can be doped with different neutron capture agents.

Suitable detection processes regarding electron antineutrinos generated in a nuclear power reactor involve several steps; interaction of an antineutrino with a proton producing a positron and a neutron. Subsequently, the positron interaction and annihilation and the capture of the neutron after thermalisation will yield two signals, coincident within a well-defined time window. The positron produces a scintillation signal within a few nanoseconds after the antineutrino interaction. This is a so-called prompt scintillation signal. A scintillation flash, randomly delayed up to a micro-second, appears from radiation emitted by a neutron capture agent (NCA) after neutron thermalisation. Current systems make use of gadolinium as a neutron capture agent due to the fact that it has the highest neutron capture cross section of any element. Other useful neutron capture agents include boron and lithium. It is observed that gadolinium will emit a gamma ray after neutron capture, whereas boron and lithium will emit an alpha particle. The latter provides a huge improvement in signal processing since a signal produced by an alpha particle has a different pulse shape than one produced by a gamma ray, and thus, making it easier to distinguish an alpha signal from the background, which is mainly composed of gamma rays. In this respect, it is noted that the high Q-value of the alpha decay provides a fixed and high energy to detect. The deposited energy excites the solvent or matrix used in the scintillator composition, which transfers the energy to a fluorophore, which is also present in the scintillator. The fluorophore, which absorbs the energy, will subsequently emit visible light.

The known scintillators as discussed here above can, however, be considerably improved in terms of stability of the detection system. Hence, it is the object of the present invention to provide a scintillator, which demonstrates an improved stability of the detection system.

SUMMARY

It has now been found that this object can be established when use is made of a particular derivate of borontriazolepyridyl.

Accordingly, the present invention provides a scintillator composition comprising a solvent or matrix containing a fluorophore having the formula (I) and/or a fluorophore having the formula (II)

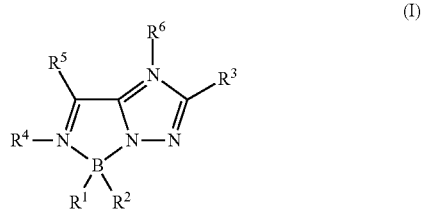

(I)

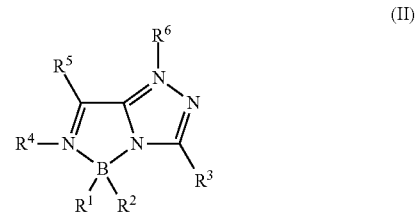

(II)

wherein $R^1$ and $R^2$, being identical or different, are independently chosen from the group consisting of hydrogen, halogen, alkyl which optionally contains one or more heteroatoms, alkoxy, aryl and alkyne with an aryl end group; $R^3$ is chosen from the group consisting of hydrogen, alkyl which optionally contains one or more heteroatoms, aryl, heterocycle, ether and ester; $R^4$ and $R^5$, being identical or different, are independently chosen from the group consisting of hydrogen, alkyl which optionally contains one or more heteroatoms, aryl, heterocycle, ether and ester, whereby the $R^4$ and $R^5$ groups are optionally combined to one cyclic structure; and $R^6$, if present, is chosen from the group consisting of hydrogen, aryl and alkyl.

The scintillator composition according to the present invention has the advantage that the fluorophore acts at the same time as a neutron capture agent, thereby reducing the number of components of the scintillator composition and at the same time demonstrating an improved stability when compared to existing detection systems. It is further observed that the use of the boron atom improves the neutron detection when compared with known systems, where, for example, gadolinium is used as a neutron capture agent. In accordance with the invention, the tuneable and small emission band of the emitted light improves the response of a photomultiplier (PMT) or other light detecting device; and the tuning of the wavelength region of absorption allows optimal matching of the energy transfer from the solvent to the fluorophore.

It is further observed that the use of the present scintillator composition results in improved optical properties when compared to known liquid scintillators. By matching the absorption spectrum of the fluorophore to the emission spectrum of the solvent (about 350 nm) more efficient energy transfer is obtained than with known fluorophores. The use of a dye with an emission at significantly longer wavelengths than the absorption of the solvent ensures a small amount of self-absorption by the fluorophore, something which reduces the efficiency of known systems. Due to the narrow emission band of the presently used fluorophore, more energy is transferred at the optimal absorption wavelength of the photomultiplier. The ability to tune the emission spectrum enables compatibility with known PMT technology (420 nm) or other emerging techniques using different wavelengths (e.g. SiPM). It is further noted that the majority of existing detectors use gadolinium as a neutron capture agent with the resulting emission of an 8 MeV cascade of gamma rays. These photons travel a large distance and hinder the miniaturization of detectors. Due to the 40 cm attenuation length of the gamma rays the effective volume of a 1 m³ detector is approximately 30%. By using in accordance with the present invention boron-10 (or natural boron which contains about 20% boron-10) as a neutron capture agent an alpha particle is emitted, which possesses a shorter attenuation length, and thereby, increasing the effective volume of the 1 m³ detector to 95%. A further advantage of boron over gadolinium is that the latter emits gamma rays, which are also present in the background radiation detected by the system. Alpha particles emitted by boron are, however, not present and, therefore, are more easily distinguished from the background signal by means of PSD (pulse shape discrimination). By increasing the signal to noise ratio the detection efficiency can be improved. A second option when using boron-10 as a neutron capture agent is to use the 480 keV gamma ray, which is emitted by the resulting excited lithium-7 after boron-10 captures a neutron and emitted an alpha-particle. The gamma ray is of such energy that it has a low attenuation length of about 11 cm keeping detector efficiency at 80%. It is in addition observed that gadolinium-containing scintillators are often subject to optical degradation and can turn the containment vessel opaque. The fluorophore to be used in accordance with the present invention is more stable and less reactive compared with gadolinium-containing scintillators.

DETAILED DESCRIPTION

Figure 1:
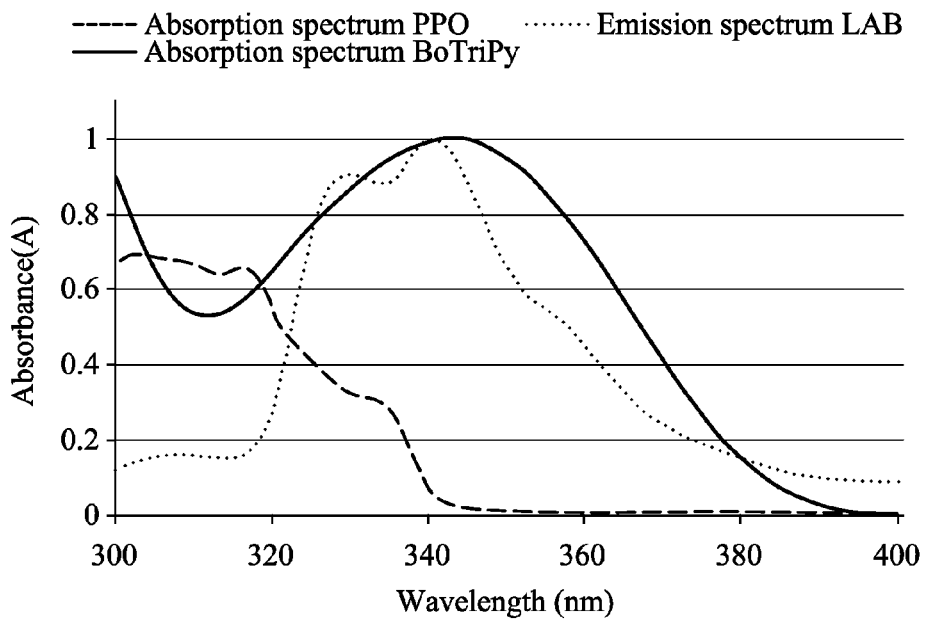
FIG. 1 is a graph showing low spectral overlap between emission and absorption of a fluorophore in accordance an embodiment of the present invention.
Figure 2:
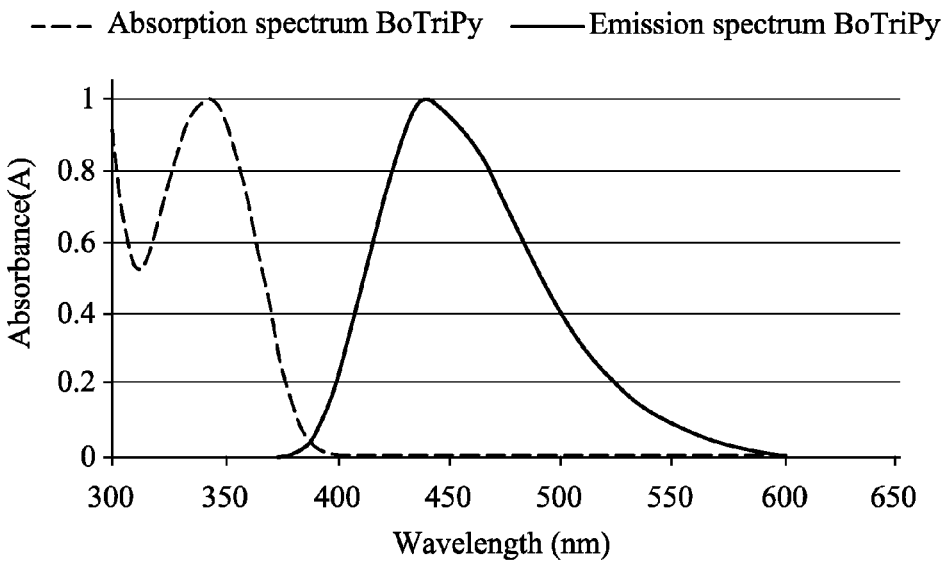
FIG. 2 is a graph showing the improved matching between solvent emission (LAB) with the present fluorophore (boron-triazolepyridyl (BoTriPy) derivate) absorption compared to PPO (2,5-diphenyloxazole, a commonly used fluorophore in scintillators)

In formulae (I) and (II), $R^1$ and $R^2$, being identical or different, are preferably independently chosen from the group consisting of fluorine, bromine, chlorine, iodine, phenyl, pentafluorophenyl, naphthalene, pyrene, phenylacetylene, naphthalene acetylene, anthracene acetylene, methyl, ethyl, butyl, methoxy, ethoxy, phenoxy and hydrogen. More preferably, $R^1$ and $R^2$, being identical or different, are preferably independently chosen from the group consisting of fluorine, phenyl, phenylacetylene, naphthalene acetylene, anthracene acetylene and pentafluorophenyl. Most preferably, $R^1$ is phenyl or fluorine, and $R^2$ is phenyl or fluorine.

In formulae (I) and (II), $R^3$ is preferably chosen from the group consisting of methyl, trifluoromethyl, ethyl, tert-butyl, phenyl, p-tolyl, pentafluorophenyl, methoxy, ethoxy, methanoate, ethanoate, thiopene, pyridyl, pyrimidyl and hydrogen. More preferably, $R^3$ is chosen from the group consisting of phenyl, methyl, trifluoromethyl, ethyl, tert-butyl, p-tolyl, and hydrogen. Most preferably, $R^3$ is phenyl or p-tolyl.

In formulae (I) and (II), $R^4$ and $R^5$, being identical or different, are preferably independently chosen from the group consisting of phenyl, p-tolyl, methyl, trifluoromethyl, ethyl, ethylene, tert-butyl, methoxy, ethoxy, phenoxy, pyridyl, pyrimidyl and hydrogen and can form one cyclic structure. More preferably, $R^4$ and $R^5$, being identical or different, are preferably independently chosen from the group consisting of phenyl, methyl, tert-butyl, ethylene and hydrogen and can form one cyclic structure. Most preferably, the groups of $R^4$ and $R^5$ are joined to form a 6 membered aromatic ring.

In formula (I) and (II), $R^6$, if present, is preferably methyl, ethyl, tert-butyl, trifluoromethyl, phenyl, p-tolyl, or hydrogen. More preferably, $R^6$ is methyl or phenyl. Most preferably, $R^6$ is not present.

In a preferred embodiment of the present invention, the scintillator composition comprises a solvent or matrix containing a fluorophore having the formula (III) and/or a fluorophore having the formula (IV)

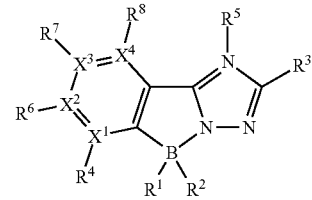

(III)

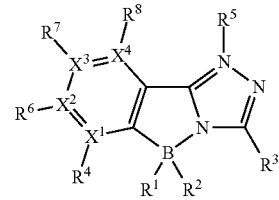

(IV)

wherein $R^1$ and $R^2$, being identical or different, are independently chosen from the group consisting of hydrogen, halogen atom, alkyl which optionally contains one or more heteroatoms, alkoxy, aryl and alkyne with an aryl end group; $R^3$, $R^4$, $R^6$, $R^7$ and $R^8$ being identical or different, are independently chosen from the group consisting of hydrogen, alkyl which optionally contains one or more heteroatoms, aryl, heterocycle, ether and ester; $R^5$, if present, is chosen from the group consisting of hydrogen, aryl and alkyl; and $X^1$, $X^2$, $X^3$ and $X^4$, being identical or different, are independently chosen from the group consisting of carbon atoms or heteroatoms.

Preferably, in formulae (III) and (IV), $R^1$ and $R^2$, being identical or different, are chosen from the group consisting of phenyl, pentafluorophenyl, halogen, naphthalene, anthracene, phenylacetylene, naphthalene acetylene and anthracene acetylene.

Preferably, in formulae (III) and (IV), $R^3$ is chosen from the group consisting of hydrogen, halogen, methyl, trifluoromethyl, tert-butyl, phenyl, 4-methylphenyl and 2-pyridyl.

Preferably, in formulae (III) and (IV) $R^4$, $R^6$, $R^7$ and $R^8$ are chosen independently from the group consisting of hydrogen, methyl, halogen, trifluoromethyl, tert-butyl, phenyl, 4-methylphenyl and 2-pyridyl.

Preferably, if present, $R^5$ is chosen from the group consisting of hydrogen, methyl, tert-butyl and phenyl.

In formulae (III) and (IV), $X^1$, $X^2$ and $X^4$ are preferably carbon atoms, and $X^3$ is preferably a carbon or a nitrogen atom.

Suitably, the fluorophore as used in accordance with the present invention is dissolved in the solvent or stabilised in the matrix. The matrix preferably comprises a sol-gel, glass or plastic. More preferably, the matrix comprises a sol-gel. Preferably, the sol-gel is a borosilicate sol-gel. Such a sol-gel can suitably be prepared by mixing tetramethyl orthosilicate, trimethoxyborane, water and borontriazole. The mixture so obtained will hydrolyze into a gel. If desired, the gel can be dried into a glass state.

The solvent to be used in accordance with the present invention is suitably a non-polar solvent. More preferably, the solvent to be used is an aromatic hydrocarbon solvent, chosen from the group consisting of benzene, toluene, pseudocumene, triethylbenzene, linear alkyl benzene, phenylxylylethane and diisopropylnapthalene.

Suitably, the fluorophore(s) is (are) present in an amount of at most 5 wt %, based on the total weight of the scintillator composition. Preferably, fluorophore(s) is (are) present in an amount of at most 2 wt %, based on the total weight of the scintillator composition.

As will be clear from the above, in accordance with the present invention one or more fluorophores can be used. The fluorophore of formula (I) can be used on its own or in combination with the fluorophore of formula (II); the fluorophore of formula (II) can be used on its own or in combination with the fluorophore of formula (I); the fluorophore of formula (III) can be used on its own or in combination with the fluorophore of formula (IV); or the fluorophore of formula (IV) can be used on its own or in combination with the fluorophore of formula (III).

Preferably, the scintillator composition according to the present invention, additionally, comprises a compound to increase the boron content in solution or in the matrix. Such an additional compound is preferably present in an amount providing a boron content of at most 25 wt % relative to the total scintillator composition. Examples of such additional compounds include trimethyl borate, triethyl borate, $LiBF_4$, borosilicate sol-gel, borosilicate glass, boron trioxide, trimethylborane and triethylborane. Preferably, such an additional compound comprises trimethyl borate, trimethylborane or borosilicate glass or borosilicate sol-gel. More preferably, the additional compound comprises borosilicate sol-gel.

Figure 3:
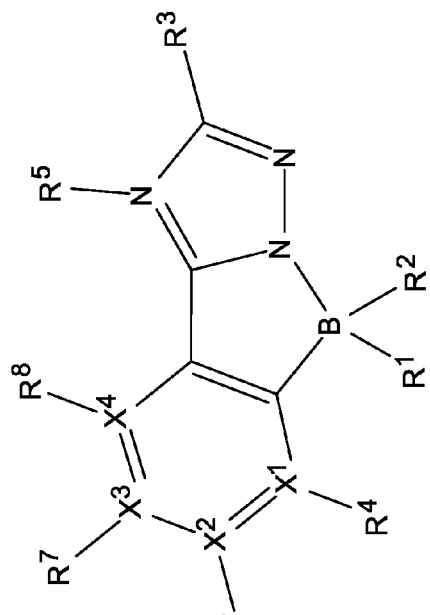
FIG. 3 shows a general scheme for the synthesis of BoTriPy via the 5-(4-pyridyl)-1,2,4-triazolate ligand complexation.
Figure 3:
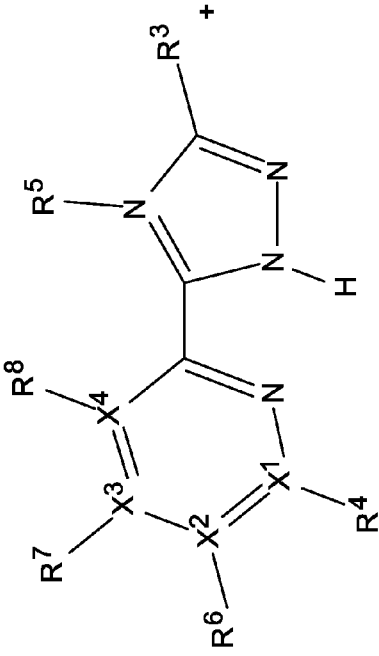

The scintillator composition according to the present invention can be suitably prepared by reacting the 5-(4-pyridyl)-1,2,4-triazole ligand (TriPy) with $BF_3$, $BPh_3$ or another equivalent boron compound. $R^1$ can be changed by means of the starting $BR^1_3$ compound or by reacting a lithium salt ($LiR^1$ or $LiR^2$) with the $F_2BoTriPy$ derivative to yield $R^1_2BoTriPy$ or $R^1R^2BoTriPy$, if the parent $B(R^1)_3$ compound is not available, stable or reactive. TriPy is a widely used ligand with well-established synthesis routes. FIG. 3 shows a general scheme for the synthesis of BoTriPy via the 5-(4-pyridyl)-1,2,4-triazolate ligand complexation.

The neutrons in accordance with the present invention can suitably be fast neutrons, slow neutrons, epithermal neutrons, hot neutrons and thermal neutrons.

The scintillator composition according to the present invention can suitably be used for determining the fuel composition inside a nuclear reactor. This is due to the fact that monitoring the reactor antineutrinos emitted by nuclear fission processes will give a detailed insight into the plutonium content of a reactor. Hence, the present invention also relates to the use of the present scintillator composition to determine the fuel composition in a nuclear reactor. This is due to the fact that monitoring the reactor antineutrinos emitted by nuclear fission will give a detailed insight into the plutonium content of a reactor.

The present invention further relates to an apparatus for detecting ionizing radiation from a source, the apparatus comprising:

at least one scintillator for emitting at least one optical signal in response to the radiation, where at least one scintillator comprises a scintillator composition in accordance with the present invention; and at least one photo detector for detecting at least one optical signal.

In addition, the present invention relates to an apparatus for detecting at least neutrons from a source, the apparatus comprising at least one scintillator for emitting at least one optical signal in response to neutrons, where at least one scintillator comprises a scintillator composition in accordance with the present invention; and at least one photo detector for detecting at least one optical signal. Preferably, the source is a spontaneous fission source, a nuclear fission source or sealed tube neutron generator.

The present invention also relates to a radiation detector for detecting at least electron antineutrinos from a source, the detector comprising at least one scintillator for emitting at least one optical signal in response to the electron antineutrinos, where at least one scintillator comprises a scintillator composition in accordance with the present invention; and at least one photo detector for detecting at least one optical signal. Preferably, the source is a nuclear power reactor, nuclear waste or spent nuclear fuel.

The present invention further relates to a process for detecting neutrons and/or electron antineutrinos wherein use is made of a scintillator composition in accordance with the present invention.

The present invention also relates to a process for detecting neutrons and/or electron antineutrinos, where the use is made of the apparatus or the radiation detector according to the present invention.

The invention claimed is:
1. A scintillator composition comprising a solvent or matrix containing a fluorophore having the formula (I) and/or a fluorophore having the formula (II)

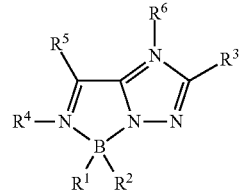

(I)

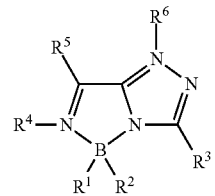

(II)

wherein $R^1$ and $R^2$, being identical or different, are independently chosen from the group consisting of hydrogen, halogen, alkyl which optionally contains one or more heteroatoms, alkoxy, aryl and alkyne with an aryl end group; $R^3$ is chosen from the group consisting of hydrogen, alkyl which optionally contains one or more heteroatoms, aryl, heterocycle, ether and ester; $R^4$ and $R^5$, being identical or different, are independently chosen from the group consisting of hydrogen, alkyl which optionally contains one or more heteroatoms, aryl, heterocycle, ether and ester, whereby the $R^4$ and $R^5$ groups are optionally combined to one cyclic structure; and $R^6$, if present, is chosen from the group consisting of hydrogen, aryl and alkyl.

2. The scintillator composition according to claim 1, wherein the scintillator composition comprises a solvent or matrix containing a fluorophore having the formula (III) and/or a fluorophore having the formula (IV):

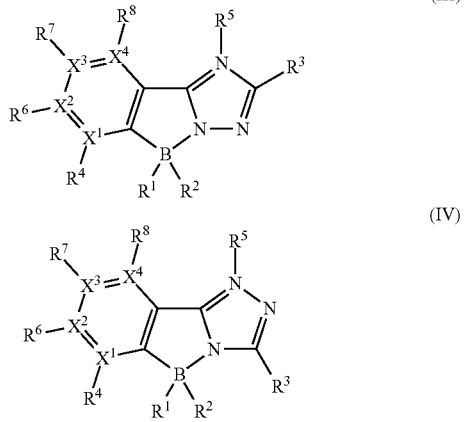

wherein $R^1$ and $R^2$, being identical or different, are independently chosen from the group consisting of hydrogen, halogen atom, alkyl which optionally contains one or more heteroatoms, alkoxy, aryl and alkyne with an aryl end group; $R^3$, $R^4$, $R^6$, $R^7$ and $R^8$ being identical or different, are independently chosen from the group consisting of hydrogen, alkyl which optionally contains one or more heteroatoms, aryl, heterocycle, ether and ester; $R^5$, if present, is chosen from the group consisting of hydrogen, aryl and alkyl; and $X^1$, $X^2$, $X^3$ and $X^4$, being identical or different, are independently chosen from the group consisting of carbon atoms or heteroatoms.

3. The scintillator composition according to claim 2, wherein $R^1$ and $R^2$, being identical or different, are chosen from the group consisting of phenyl, pentafluorophenyl, halogen, naphthalene, anthracene, phenylacetylene, naphthalene acetylene and anthracene acetylene.

4. The scintillator composition according to claim 2, wherein $R^3$ is chosen from the group consisting of hydrogen, halogen, methyl, trifluoromethyl, tert-butyl, phenyl, 4-methylphenyl and 2-pyridyl.

5. The scintillator composition according to claim 2, wherein $R^4$, $R^6$, $R^7$ and $R^8$ are chosen independently from the group consisting of hydrogen, methyl, halogen, trifluoromethyl, tert-butyl, phenyl, 4-methylphenyl and 2-pyridyl.

6. The scintillator composition according to claim 2, wherein $R^5$, if present, is chosen from the group consisting of hydrogen, methyl, tert-butyl and phenyl.

7. The scintillator composition according to claim 2, wherein $X^1$, $X^2$ and $X^4$ are carbon atoms, and $X^3$ is a carbon or a nitrogen atom.

8. The scintillator composition according to claim 2, wherein the fluorophore is dissolved in the solvent or stabilised in the matrix, which matrix comprises a sol-gel, glass or plastic.

9. The scintillator composition according to claim 8, wherein the aromatic hydrocarbon solvent is chosen from the group consisting of benzene, toluene, pseudocumene, triethylbenzene, linear alkyl benzene, phenylxylylethane and diisopropylnapthalene.

10. The scintillator composition according to claim 8, wherein the sol-gel is a borosilicate sol-gel.

11. The scintillator composition according to claim 2, wherein the fluorophore(s) is (are) present in an amount of at most 5 wt %, based on the total weight of the scintillator composition.

12. The scintillator composition according to claim 2, which in addition comprises a compound to increase the boron content in solution.

13. The scintillator composition according to claim 12, wherein the compound is present in an amount providing a boron content of at most 25 wt % relative to the total scintillator composition.

14. An apparatus for detecting ionizing radiation from a source, the apparatus comprising:
at least one scintillator for emitting at least one optical signal in response to the radiation, where at least one scintillator comprises a scintillator composition as defined in claim 2, and
at least one photo detector for detecting at least one optical signal.

15. An apparatus for detecting at least neutrons from a source, the apparatus comprising at least one scintillator for emitting at least one optical signal in response to neutrons, where at least one scintillator comprises a scintillator composition as defined in claim 2; and at least one photo detector for detecting at least one optical signal.

16. A radiation detector for detecting at least electron antineutrinos from a source, the detector comprising at least one scintillator for emitting at least one optical signal in response to the electron antineutrinos, where at least one scintillator comprises a scintillator composition as defined in claim 2; and at least one photo detector for detecting at least one optical signal.

17. A process for detecting a presence of neutrons and/or electron antineutrinos comprising providing a scintillator which comprises a scintillator composition according to claim 2, wherein the scintillator emits an optical signal in response to the presence of neutrons and/or electron antineutrinos, and detecting the optical signal emitted by the scintillator to thereby detect the presence of neutrons and/or electron antineutrinos.

18. A process which comprises detecting neutrons and/or electron antineutrinos with an apparatus according to claim 15.

19. The process according to claim 18, which comprises providing a source of neutrons selected from the group consisting of a spontaneous fission source, a nuclear fission source, and a sealed tube neutron generator, and detecting the neutrons emitted from the source with the apparatus.

20. A process comprising detecting at least electron antineutrinos from a source thereof with a radiation detector according to claim 16.

21. The process according to claim 20, comprising providing a source of at least electron antineutrinos, wherein the source of at least electron antineutrinos is a nuclear power reactor, nuclear waste or spent nuclear fuel, and detecting at least electron antineutrinos emitted by the source with the radiation detector.

* * * * *